United States Patent [19]
Johnston

[11] Patent Number: 6,073,933
[45] Date of Patent: Jun. 13, 2000

[54] LOAD BEARING WASHER AND DIRT EXCLUDER

[75] Inventor: David E. Johnston, East Hebron, N.H.

[73] Assignee: Freudenberg-NOK General Partnership, Plymouth, Mich.

[21] Appl. No.: 09/038,534

[22] Filed: Mar. 11, 1998

[51] Int. Cl.[7] .................................................. F16J 15/34
[52] U.S. Cl. ........................ 277/352; 277/371; 277/549
[58] Field of Search .................................. 277/352, 353, 277/371, 407, 549, 560, 566, 571

[56] References Cited

U.S. PATENT DOCUMENTS

| | | |
|---|---|---|
| 3,345,078 | 10/1967 | Bialkowski . |
| 4,417,734 | 11/1983 | Sundberg . |
| 4,482,194 | 11/1984 | Chambers, Sr. . |
| 4,555,376 | 11/1985 | Butler . |
| 4,613,143 | 9/1986 | Butler . |
| 4,636,155 | 1/1987 | Francis . |
| 4,667,968 | 5/1987 | Nash et al. . |
| 4,765,632 | 8/1988 | D'Alterio . |
| 4,789,166 | 12/1988 | Rericha et al. . |
| 5,014,998 | 5/1991 | Lauridsen . |
| 5,072,950 | 12/1991 | Littleproud et al. . |
| 5,245,741 | 9/1993 | Smith et al. . |
| 5,261,677 | 11/1993 | Gotoh et al. ......................... 277/549 X |
| 5,462,287 | 10/1995 | Hering et al. . |
| 5,626,520 | 5/1997 | Mazziotti ............................. 277/566 X |
| 5,908,249 | 6/1999 | Nisley et al. ........................ 277/566 X |
| 5,944,321 | 8/1999 | Niebling et al. ......................... 277/549 |

Primary Examiner—Anthony Knight
Assistant Examiner—Karlena D. Schwing
Attorney, Agent, or Firm—Dinnin & Dunn, P.C.

[57] ABSTRACT

A washer and dirt excluder for use with a seal. The washer and dirt excluder includes a flexible ring where that ring is in contact with an outer flange. The washer and dirt excluder further includes a stopper member located at a center point of the flexible ring. The washer and dirt excluder also includes a protrusion extending from a side of the washer opposite the stopper.

12 Claims, 1 Drawing Sheet

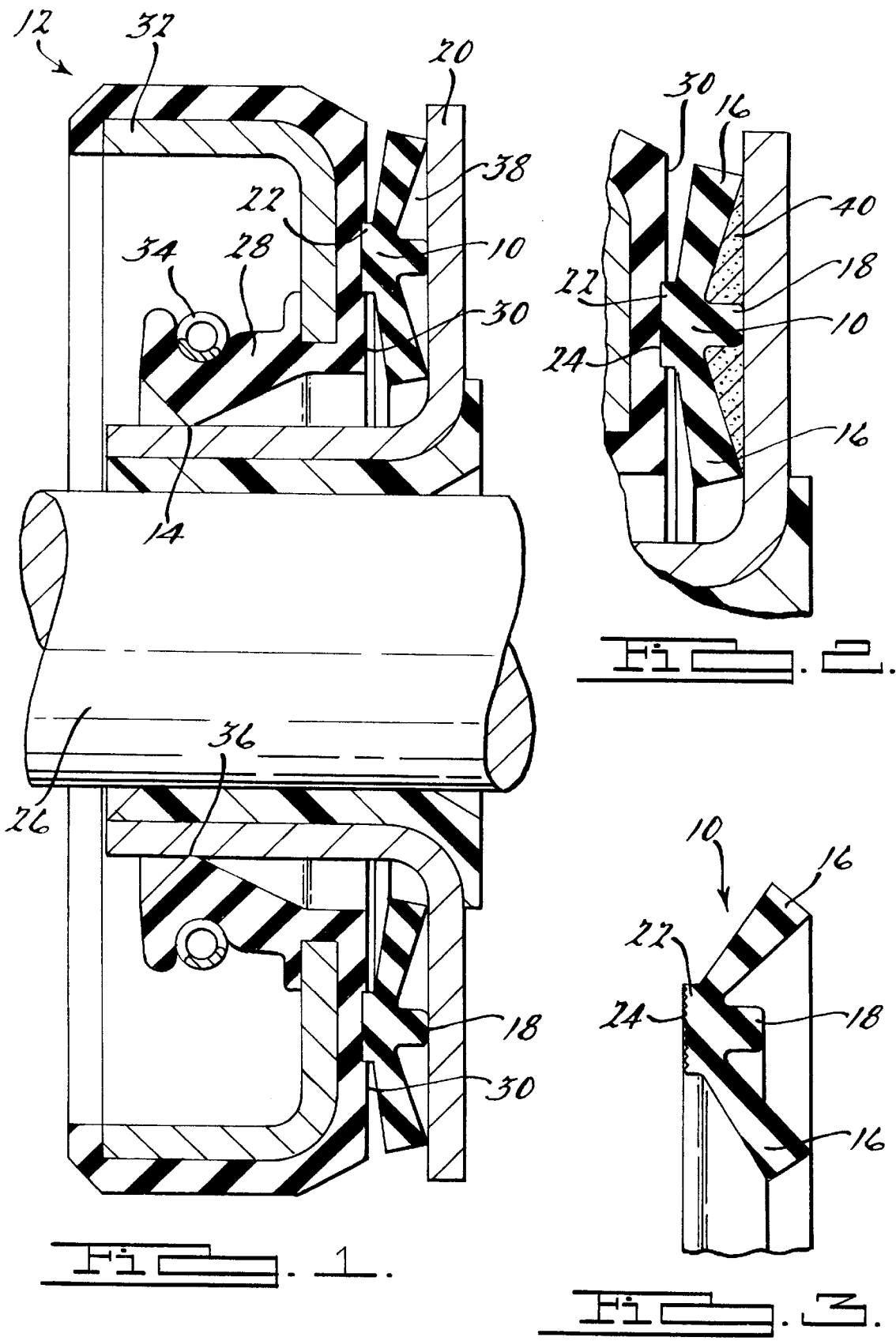

LOAD BEARING WASHER AND DIRT EXCLUDER

BACKGROUND OF THE INVENTION

1. Field of the Invention

The present invention relates generally to shaft seals and more particularly, to a load bearing washer and dirt excluder for use with a shaft seal.

2. Description of Related Art

As automobiles have become more profitable the automobile manufacturers have demanded ever increasing longevity and quality in the shaft seals used throughout their automotive vehicles. The automobile manufacturers also require that the seals retain grease and exclude dirt, corrosion particles and other corroding liquids from entering into key operating components of the automotive vehicle. The exclusion of foreign particles by the dirt excluding lip in most seals is very important even if grease is not used. Also, it is desirable to have foreign matter which is contacted by the dirt excluding lip to be outwardly removed and not sent toward the sealing surfaces.

Many seals have been made with elastomers such as acrylic rubber, butyl rubber or other types of rubber in order to insure long-life at the dirt exclusion seal and at the seal interface itself. There have been many methods for connecting dirt excluding lips from seal interfaces but a long-lasting dust excluding lip for use with a seal lip is still needed in the art.

Furthermore, there is a need in the art for a shaft seal assembly which has reduced forces and provides dust and mud exclusion capabilities using a dust excluding lip which is more cost effective and easier to manufacture then others in the current prior art.

SUMMARY OF THE INVENTION

One object of the present invention is to provide a new load bearing washer and dirt excluder.

Another object of the present invention is to provide a shaft seal assembly that includes a load bearing washer and dirt excluder which reduces friction on the seal due to assembly forces.

Another object of the present invention is to provide a dust and mud exclusion capability for a shaft seal assembly.

Still another object of the present invention is to provide a load bearing washer and dirt excluder that does not need precise manufacturing tolerances.

To achieve the foregoing objects the wash and dirt excluder for use with a seal includes a flexible ring where that ring is in contact with an outer flange. The washer and dirt excluder further includes a stopper member located at a center point of the flexible ring. The washer and dirt excluder also includes a protrusion which extends from a side of the washer opposite that of the stopper.

One advantage of the present invention is that it reduces friction on a shaft seal assembly due to assembly forces.

Another advantage of the present invention is that it provides a dust and mud exclusion capability for a shaft seal assembly.

Yet a further advantage of the present invention is that it reduces manufacturing costs by reducing manufacturing tolerances for the washer and dirt excluder.

Other objects, features and advantages of the present invention will become apparent from the subsequent description and appended claims, taken in conjunction with the accompanying drawings.

BRIEF DESCRIPTION OF THE DRAWINGS

FIG. 1 shows a cross-section of the present invention.

FIG. 2 shows a partial cross-section of the shaft seal assembly.

FIG. 3 shows a cross-section of the washer and dirt excluder in its free state.

BEST MODE OF CARRYING OUT THE INVENTION AND DESCRIPTION OF THE PREFERRED EMBODIMENT(S)

Referring to the drawings, a new load bearing washer and dirt excluder 10 is shown according to the present invention. The washer and dirt excluder 10 is generally used in a shaft seal assembly 12. The washer and dirt excluder 10 is used to keep foreign contaminants such as dust, metal particles, and other contaminants from approaching and contaminating the seal surface 14 of the shaft seal assembly 12. The use of the new washer and dirt excluder 10 also reduces the friction on the cassette of the shaft seal assemblies 12 due to any assembly forces during the manufacturing process. Furthermore, the load bearing washer and dirt excluder 10 will provide a dust and mud exclusion capability not found in the prior art thus enabling longer life for the shaft seal 12 at the sealing surface. Also, the load bearing washer and dirt excluder 10 reduces the cost of manufacturing shaft seal assemblies because of the lower tolerances needed when making the legs or rings 16 of the load bearing washer and dirt excluder 10. The legs or rings 16 of the washer 10 do not have to be the exact same length to work in a proper manner.

The load bearing washer and dirt excluder 10 includes a flexible plastic ring or legs 16 in its preferred embodiment. Specifically, the plastic material is VESPEL™ or a polyamide material but any other type of flexible plastic may be used for the ring portion of the load bearing washer and dirt excluder 10. The ring or leg portion 16 of the load bearing washer 10 is flexible such that it has a free state which is the natural position for the plastic ring but the ring 16 is capable of being bent to numerous different positions within a shaft seal assembly 12. The ability to bend to different positions allows for the load bearing washer and dirt excluder 10 to be used in a vast array of different shaped and sized shaft seal assemblies 12.

The load bearing washer 10 also includes a stopper member 18 which is located at a center point of the flexible ring 16. The stopper member 18 is also made of the same flexible plastic material as the washer 10. The stopper member 18 is used to control the amount of flexibility or bend in the ring or legs 16 of the washer 10. The stopper member 18 will come into contact with a surface of the shaft seal assembly 12, in our embodiment it is the outer flange or wear sleeve 20 of the shaft seal assembly 12, thus creating a predefined distance for the ring or legs 16 to bend when in an operating position. The washer 10 also includes on the side opposite of the stopper member 18 a protrusion 22 which extends from the washer 10. In the preferred embodiment, the protrusion 22 is two millimeters wide but it should be noted that any length or width can be used depending on the size of the seal assembly being used. In the preferred embodiment, the protrusion 22 also has an outer surface 24 that is roughened such that it is capable of indenting into an elastomer or PTFE back of the seal 12 when the shaft seal assembly is pushed together into its unitized state.

The shaft seal assembly 12 includes a wear sleeve or outer flange 20 which generally has an L-shape. The wear sleeve or outer flange 20 is in contact with a shaft 26 which is rotating or in a static state. The shaft seal assembly 12 also includes an elastomer sealing member 28. The sealing member 28 includes a radial external face 30. The shaft seal assembly 12 also includes an insert member 32 to give strength to the shaft seal assembly 12. The shaft seal assembly 12 also includes a spring member 34 used to urge the sealing lip 36 into contact with the running surface on the wear sleeve or outer flange 20.

The load bearing washer and dirt excluder 10 is placed between the radial external face 30 of the shaft seal and the wear sleeve or outer flange 20 of the shaft seal assembly 12. When the washer 10 is placed between the two surfaces, the outer flange 20 and radial external face 30 of the shaft seal move toward one another thus compressing and bending the flexible plastic ring 16 until the outer flange 20 comes into contact with the stopper member 18 and the elastomer seal member 28 comes into contact with the roughened surface 24 of the washer. The roughened surface 24 is indented into the elastomer 28 thus creating a secure attachment for the washer 10 in the shaft seal assembly 12. When in its operational state the shaft seal assembly 12 has the legs or ring 16 of the washer 10 acting as the sealing edges against the outer flange 20 while the protrusion acts as a sealing member on the elastomer seal face 30. A gap 38 is formed between the stopper member 18 and the flexible ring or legs 16. This gap 38 may be filled with grease 40 if so desired to further intensify the barrier to dirt and mud from the seal edge interface. The plastic ring 16 will bend a predetermined distance as measured from the stopper member 18 and protrusion 22 as it is indented into the elastomer by being pushed within the shaft seal assembly 12.

The present invention has been described in an illustrative manner, it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A washer and dirt excluder including:
   a generally planar flexible ring having legs that extend circumferentially from a center point;
   a stopper member located at said center point of said flexible ring, said stopper member defines amount of flexibility in said legs; and
   a protrusion extending from a side of the washer and dirt excluder opposite said stopper member.

2. The washer and dirt excluder of claim 1 wherein said protrusion having a roughened surface.

3. The washer and dirt excluder of claim 2 wherein said roughened surface contacts the seal and creates a secure interface.

4. The washer and dirt excluder of claim 1 wherein said ring is made of plastic.

5. The washer and dirt excluder of claim 1 wherein said ring having a free state and load state.

6. The washer and dirt excluder of claim 1 wherein a gap is formed between said ring and said stopper member.

7. The washer and dirt excluder of claim 6 wherein said gap is filled with a grease.

8. A shaft seal assembly for use on a shaft, said assembly including:
   an elastomer seal, said seal having a radially extending seal face;
   an outer flange in contact with said elastomer seal; and
   a washer located between said seal face and said outer flange, said washer being a flexible plastic ring having legs that extend circumferentially from a center point, said washer having a stopper member, wherein said stopper member controls amount of flexibility of said legs.

9. The shaft seal assembly of claim 8 wherein said stopper member extends a predetermined distance.

10. The shaft seal assembly of claim 9 wherein said washer having a protrusion, said protrusion indents into said seal face.

11. The shaft seal assembly of claim 10 wherein a gap is formed between said ring and said stopper member.

12. The shaft seal assembly of claim 11 wherein said gap is filled with a grease.

* * * * *